United States Patent
Matsumoto

Patent Number: 5,491,765
Date of Patent: Feb. 13, 1996

[54] LIGHT SOURCE DEVICES FOR ENDOSCOPES

[75] Inventor: Shinya Matsumoto, Tokyo, Japan

[73] Assignee: Olympus Optical Co., Ltd., Tokyo, Japan

[21] Appl. No.: 316,029

[22] Filed: Sep. 30, 1994

Related U.S. Application Data

[63] Continuation-in-part of Ser. No. 162,260, Dec. 7, 1993, abandoned.

[30] Foreign Application Priority Data

Dec. 8, 1992 [JP] Japan ..................... 4-351431

[51] Int. Cl.$^6$ .................................... G02B 6/36
[52] U.S. Cl. ................ 385/33; 385/119; 359/708; 359/718; 362/335
[58] Field of Search ................... 385/33, 31, 36, 385/39, 117, 116, 118, 119, 147; 359/708, 718; 362/335

[56] References Cited

U.S. PATENT DOCUMENTS

| | | | |
|---|---|---|---|
| 4,824,225 | 4/1989 | Nishioka | 359/718 |
| 4,952,040 | 8/1990 | Igarashi | 359/708 |
| 4,953,937 | 9/1990 | Kikuchi | 385/33 |
| 5,005,957 | 4/1991 | Kanamori et al. | 359/708 |
| 5,270,825 | 12/1993 | Takasugi | 359/708 |

FOREIGN PATENT DOCUMENTS

| | | |
|---|---|---|
| 299475 | 1/1989 | European Pat. Off. . |
| 1144009 | 6/1989 | Japan . |

*Primary Examiner*—Akm E. Ullah
*Attorney, Agent, or Firm*—Cushman, Darby & Cushman

[57] ABSTRACT

A light source device for endoscopes comprising a light source lamp, a light guide fiber bundle and a collector optical system of the light source device for collecting rays emitted from the light source lamp onto an end surface of incidence of a light guide fiber bundle, and satisfying the condition shown below. This light source device is compact and allows rays to be incident onto the light guide fiber bundle at a high efficiency.

$$\sin\theta \leq G(\theta) < \tan\theta$$

6 Claims, 4 Drawing Sheets

LIGHT SOURCE DEVICES FOR ENDOSCOPES

This application is a continuation-in-part of my application No. 08/162,260, filed Dec. 7, 1993, now abandoned.

BACKGROUND OF THE INVENTION a) Field of the Invention

Figure 1:
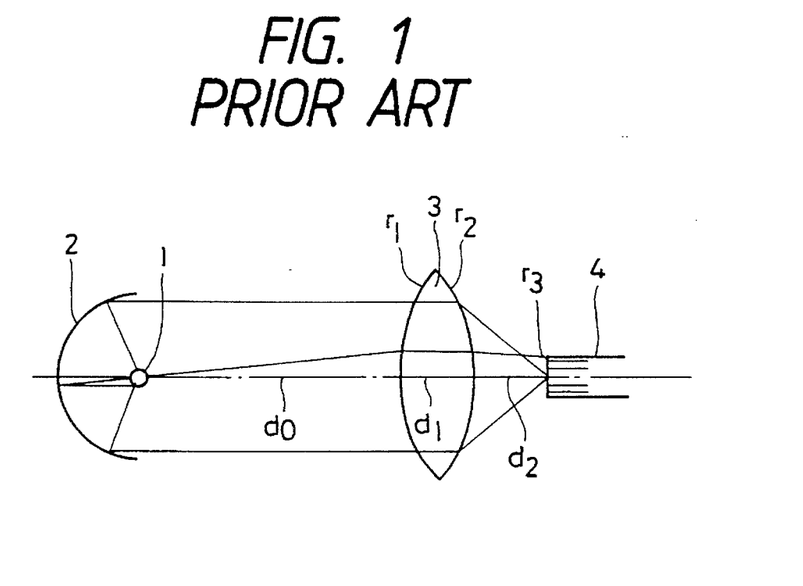
FIG. 1 shows a sectional view illustrating a composition of a conventional light source device.

The present invention relates to a light source device which is to be employed for endoscopes such as fiber scopes, non-flexible endoscopes, video scopes and so b) Description of the Prior Art There is conventionally known a light source device which consists, as illustrated in FIG. 1, of a light source lamp 1, and an optical system composed of a reflecting mirror 2 and a collector lens component 3 for imaging or collecting a light bundle emitted from the light source lamp 1. This light source device is configured so as to allow the light bundle to be incident onto a light guide fiber bundle 4 which is disposed in an endoscope for transmitting an illuminating light bundle.

Figure 2:
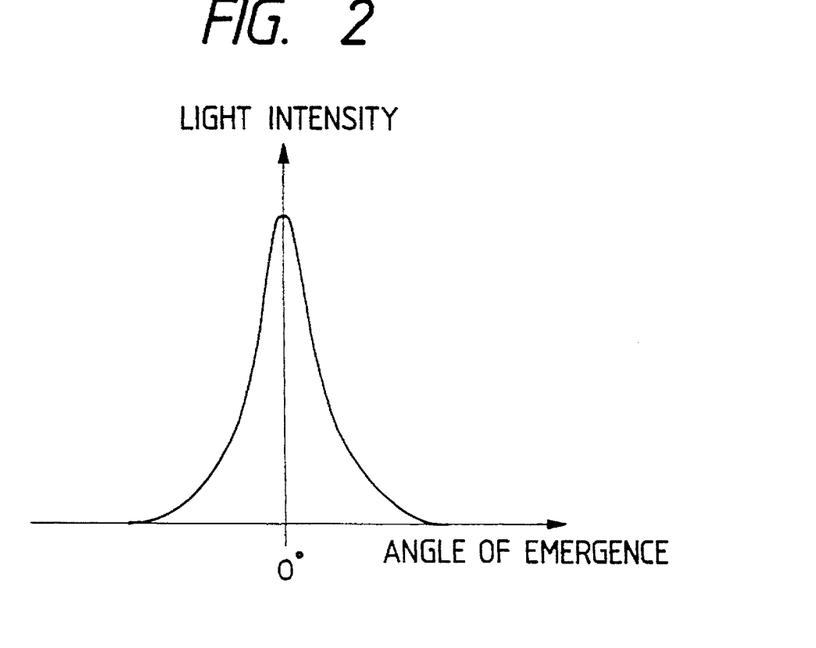
FIG. 2 shows a graph illustrating light intensity distributions versus angles of rays emitted from a light source lamp.
Figure 3:
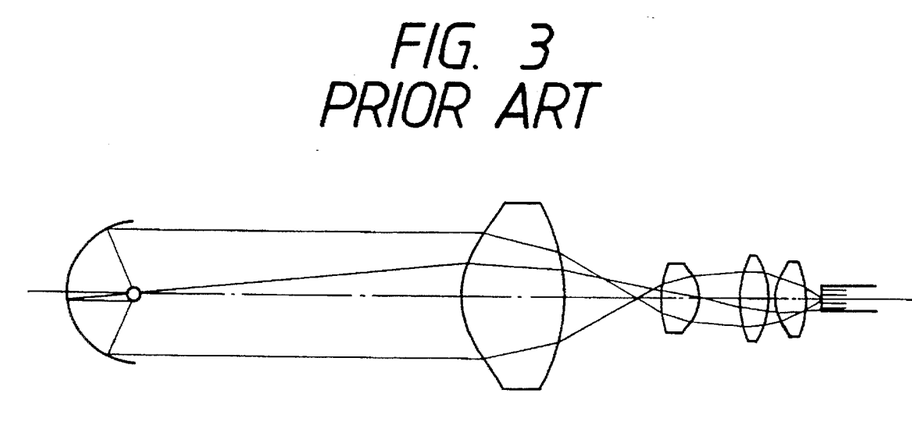
FIG. 3 shows a sectional view illustrating a composition of another conventional light source device.

Most of light source lamps which are used in general light source devices are xenon lamps, halogen lamps and metal halide lamps. These lamps are ordinarily used in combination with reflecting mirrors which are disposed so as to have focal points thereof located at bright spots of the light source lamps and reflect light bundles in forms of parallel light bundles. Light bundles which are emitted from the light source lamps are divergent within certain angles which are determined dependently on sizes of the bright spots of the light source lamps and under influences due to rays emitted from the bright spots of the light source lamps, and have light intensity distributions such as that illustrated in FIG. 2. In this drawing, angles of emergence are taken as the abscissa and light intensities are taken as the ordinate. Further, the rays emitted from the light source lamps including those reflected by the reflecting mirrors are distributed with sufficient intensities within ranges of 4° to 6° at widest though the distributions of angles of the emerging rays are different dependently on types of the light source lamps. For this reason, the optical systems of the light source devices are adopted for collecting the rays emitted within the above-mentioned angles and leading there rays onto light guide fiber bundles. Since outside diameters of the endoscopes are restricted, restrictions are imposed also on outside diameters of the light guide fiber bundles. When real images of the bright spots of the light source lamps which are formed with the rays emitted from the light source lamps and having passed through the optical systems of the light source devices are not contracted sufficiently, intensities of the rays incident onto the light guide fiber bundles are low, thereby lowering utilizing efficiency of the rays emitted from the light source lamps.

As a conventional optical system for the light source devices for endoscopes which correct the defect described above, there is known, for example, an optical system disclosed by Japanese Patent Kokai Publication No. Hei 1-144,009. However, this optical system uses as many as four lens components, and therefore has a defect that it requires a high manufacturing cost and another defect that it has a complicated lens composition, thereby inevitably enlarging light source devices which comprise this optical system.

SUMMARY OF THE INVENTION

A primary object of the present invention is to provide a light source device for endoscopes which comprises a small number of lens components so as to be configured compact and allows rays to be incident onto a light guide fiber bundle at a high efficiency.

The light source device for endoscopes according to the present invention comprises a light source lamp and a light source optical system for collecting rays emitted from the light source lamp onto an end surface of incidence of a light guide fiber bundle, and is characterized in that it satisfies the following condition (1):

$$\sin\theta \leq G(\theta) < \tan\theta \quad (1)$$

wherein the reference symbol h represents a height of incidence, of a ray which is emitted from the light source lamp in a direction in parallel with an optical axis, the reference symbol f designates a focal length of the optical system, the reference symbol $\theta$ denotes an angle of emergence, from the optical system, of the ray having the height of incidence h and the reference symbol $G(\theta)$ represents a quotient of h/f.

An optical system which satisfies the well-known sine condition of $h = f \cdot \sin\theta$ is advantageous from a viewpoint of correction of aberrations when it is used as a collector optical system. When this optical system is used as an imaging optical system which does not serve for imaging, however, correction of aberrations is not so important for this optical system as that for an imaging optical system. Accordingly, a collector optical system need not always be the optical system which satisfies the sine condition of $h = f \cdot \sin\theta$ (this optical system will hereinafter be referred to as an f·sinθ type).

Figure 4:
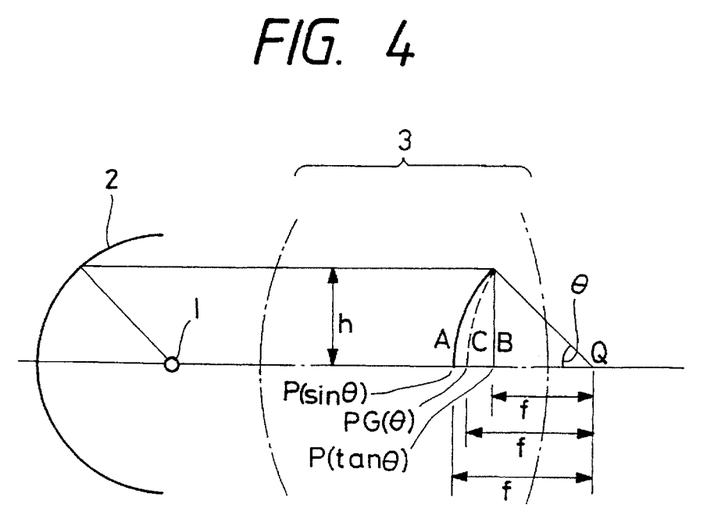
FIG. 4 shows a diagram comparing various types of optical systems of light source devices.

Further, the optical system of the f·sinθ type has a principal plane A which is a spherical surface having a center located at an image point Q and passing an image side principal point P(sinθ) as shown in FIG. 4, and has a focal length longer than that of an optical system satisfying a condition of $h = f \cdot \tan\theta$ (this optical system will hereinafter be referred to as an f·tanθ type). As a result, the optical system of the f·sinθ type has a high magnification for the rays emitted from the light source lamp when it is used as the optical system of the light source device and cannot sufficiently contract the real image of the bright spot of the light source lamp which is formed with the rays emitted from the light source lamp and having passed through the optical system of the light source device, thereby lowering intensities of the rays incident on the light guide fiber bundle or allowing loss of the intensities of the rays. It is therefore necessary in this case that $G(\theta)$ which is defined as h/f satisfies the relationship mentioned below:

$$\sin\theta \leq G(\theta)$$

In contrast, the optical system of the f·tanθ type has a principal plane B which is a planar surface passing an image side principal point P(tanθ) and perpendicular to the optical axis as shown in FIG. 4. Accordingly, the optical system of the f·tanθ type can have a short focal length and a low magnification for the rays emitted from the light source lamp when it is used as the optical system of the light source device, whereby this optical system can sufficiently contract the real image of the bright spot of the light source lamp formed with the rays emitted from the light source lamp and having passed through the optical system, and allows a larger amount of rays to be incident onto the light guide fiber bundle or reduces the loss of light intensities.

On the other hand, the optical system of the f·tanθ type produces remarkable coma and cannot condense the rays emitted from the light source lamp onto a predetermined imaging location, thereby being incapable of leading the rays efficiently to the light guide fiber bundle and allowing the loss of light intensities. When the optical system of the f·tanθ type is used as the optical system of the light source device, it is therefore necessary that G(θ) satisfies following condition:

$$G(\theta) < \tan\theta$$

For the reason described above, the optical system of the light source device according to the present invention must satisfy the above-mentioned condition (1).

It should be noted that the condition (1), as a matter of course, effects within a predetermined range of angle, i.e. within a range of angle to be used in the optical system. In the embodiments of the present application mentioned in below, the maximum diameter of marginal ray, which is emitted from the light source in parallel with the optical axis, is shown as an effective diameters of the light source lamp. The condition (1) effects within the maximum marginal ray, and thus it is not necessary to satisfy the condition (1) in a range exceeding over the maximum marginal ray.

DETAILED DESCRIPTION OF THE PREFERRED EMBODIMENTS

Now, the light source device for endoscopes according to the present invention will be described more detailedly below with reference to the preferred embodiments illustrated in the accompanying drawings.

Figure 5:
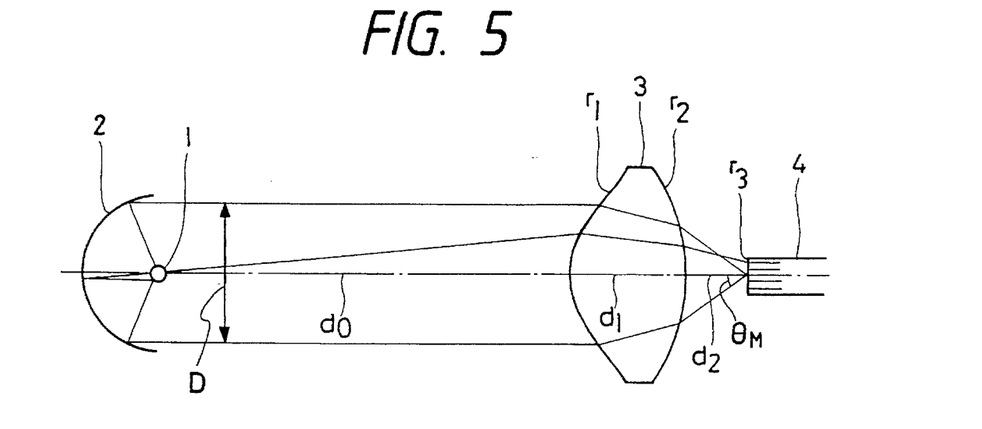
FIG. 5 shows a sectional view illustrating a composition of a first embodiment of the light source device according to the present invention.

The first embodiment of the present invention has the composition illustrated in FIG. 5, wherein the light source device consists of a light source lamp 1, a reflecting mirror 2 for transforming a light bundle emitted from the light source lamp 1 into a parallel light bundle and a collector optical system 3 for imaging or collecting rays reflected from the reflecting mirror 2 onto an end surface of a light guide fiber bundle 4. Since the light guide fiber bundle has a restricted outside diameter, it is necessary to sufficiently contract an image of a bright spot of the light source lamp 1. Therefore, it is necessary that the collector optical system 3 has a focal length shortened so as to satisfy the condition (1). In order to enhance the effect obtainable with the present invention, the first embodiment uses an aspherical surface as a light sorce side surface of the collector optical system 3 which serves for effectively correcting spherical aberration and offaxial coma so that rays emitted from the light source lamp 1 will not be divergent so remarkably due to the aberrations, incident with a high efficiency onto the light guide fiber bundle and have high intensities. Further, the first embodiment of the present invention has another merit that is can be fabricated with a hydrated glass material or the like.

For accomplishing the object of the present invention, it is desirable that the collector optical system has an aspherical surface expressed by the formula which is to be described later and satisfies, in addition to the above-mentioned condition (1), the conditions (2) through (7) listed below:

$$-0.6 < (n-1)f/r_2 < 0 \quad (2)$$

$$0.6 < (n-1)f/r_1' < 1.5 \quad (3)$$

$$-0.3 < Ef^3 < 0 \quad (4)$$

$$-1.0 < Gf^7 < 0 \quad (5)$$

At least one of the aspherical coefficients F, H and I is positive.

$$(6)$$

$$0.3 < d_0/f < 10 \quad (7)$$

When the optical system of the light source device produces aberrations, the rays emitted from the light source lamp are not collected onto a predetermined imaging location and rays are incident onto the light guide fiber bundle in a small amount, thereby lowering the utilization efficiency of the rays. For this reason, it is necessary to correct spherical aberration, coma and so on, and the collector optical system has, at least on the side of the light source lamp, an aspherical surface which is approximated by the formula shown below:

$$X = CY^2/(1+(1-PC^2Y^2)^{1/2}) + BY^2 + EY^4 + FY^6 + GY^8 + HY^{10} + IY^{12}.$$

wherein the X axis is taken as an optical axis, the Y axis is taken on a plane perpendicular to the optical axis, the origin is taken as an intersection between the optical axis and the aspherical surface, the reference symbol C represents curvature as measured on a reference sphere of the aspherical surface, and the reference symbols P, B, E, F, G, H and I designate coefficients for expressing an aspherical surface. Further, the reference symbol n denotes a refractive index of the collector optical system, and the reference symbol $r_1'$ represents a radius of curvature as measured on the reference sphere of the aspherical surface located on the side of the light source lamp and expressed as ½B when both C and P are zero. Furthermore, the reference symbol $r_2$ designates a radius of curvature as measured on the surface located on the side of the light guide fiber bundle, the reference symbol $d_0$ denotes a distance as measured from the light source lamp to a first surface of the collector optical system, and the reference symbol f represents a focal length of the collector optical system as a whole.

The condition (2) is required for preventing an upper ray from being totally reflected by the lens surface. For effectively collecting the rays emitted from the light source lamp by using a collector optical system which is composed of a single collector lens component, it is necessary to distribute refractive powers between both surfaces of the collector lens component. If the lower limit of the condition (2) is exceeded, a second surface of the collector lens component will have too strong a refractive power, whereby the upper ray will be totally reflected and intensities of the rays will be lowered. If the upper limit of the condition (2) is exceeded, in contrast, the second surface of the collector lens component will have too weak a refractive power, whereby a refractive power of the collector lens component will be concentrated on the first surface thereof and the upper ray will be totally reflected also in this case. It is therefore desirable that the condition (2) is satisfied by the collector lens component of the light source device according to the present invention.

The condition (3) is required for preventing the upper ray from being totally reflected and correcting aberrations. If the lower limit of the condition (3) is exceeded, the first lens surface will have too strong a refractive power, whereby the upper ray will be totally reflected and the intensities of the rays will be lowered as in the case where the lower limit of the condition (2) is exceeded.

Further, remarkable spherical aberration will be produced and the rays emitted from the light source lamp will not be incident properly onto the light guide fiber bundle, thereby causing lowering of the intensities of the rays. If the upper limit of the condition (3) is exceeded, in contrast, the first lens surface will have too weak a refractive power and the refractive power of the collector optical system will be concentrated on the second lens surface, thereby causing the total reflection of the upper ray as in the case where the lower limit of the condition (3) is exceeded. It is therefore desirable that the collector lens component of the light source device satisfies the condition (3).

The condition (4) and the condition (5) are required for correcting spherical aberration and coma. For correcting spherical aberration and coma, it is desirable to select, for the aspherical surface, a shape which lowers curvature progressively as portions of the aspherical surface are farther from the optical axis of the collector lens component. If the condition (4) or the condition (5) is not satisfied, remarkable spherical aberration and coma will be produced, whereby the rays emitted from the light source lamp will not be incident properly onto the light guide fiber bundle and lowering the intensities of the rays will be caused. It is therefore desirable that the collector lens component of the light source device satisfies the condition (4) and the condition (5).

The condition (6) is adopted for correcting spherical aberration of high orders and coma of high orders. If the condition (6) is not satisfied, remarkable spherical aberration and coma will be produced, as in the case where the condition (4) or the condition (5) is not satisfied, whereby the rays emitted from the light source lamp will not be incident properly onto the light guide fiber bundle and lowering of the intensities of the rays will be caused. It is therefore necessary that the collector lens component of the light source device satisfies the condition (6).

The condition (7) is necessary for reducing an angle of emergence θ of the offaxial principal ray. If the condition (7) is not satisfied, the angle of emergence θ of the offaxial principal ray will be large and the intensities of the rays emitted from the light source lamp will be lowered during transmission through the light guide fiber bundle, thereby lowering the intensities of the rays emerging from the light guide fiber bundle. It is therefore desirable that the collector lens component of the light guide fiber bundle satisfies the condition (7).

The above explanation of the conditions (2) to (7) are for the cases that the collector optical system comprises a single collector lens component. In case that the collector optical lens system comprises a plurality of collector lens components, it is desired that the collector lens component disposed on the position which is the closest to the light source satisfies the above conditions (2) to (7).

Figure 6:
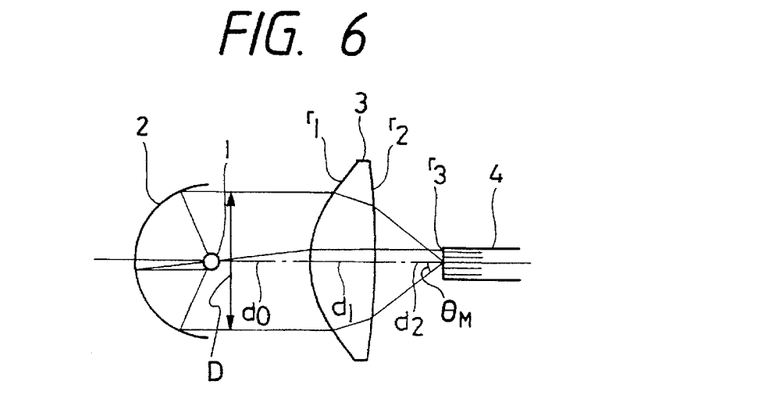
FIG. 6 shows a sectional view illustrating a composition of a second embodiment through a fifth embodiment of the light source device according to the present invention.

The second embodiment through the fifth embodiment of the light source device according to to the present invention has the composition illustrated in FIG. 6.

The second embodiment of the present invention uses a collector optical system which is configured so as to have a principal plane which is intermediate between that of the f·sinθ type collector optical system and that of the f·tanθ type collector optical system by selecting a material having a refractive index of $n_d=1.883$ for the collector optical system of the second embodiment. Values fo G(θ), sinθ and tanθ which are selected for the second embodiment and the first embodiment as well as those for the other embodiments to be described later are listed in table 1 and Table 3. As compared with the first embodiment illustrated in FIG. 5, the second embodiment permits utilizing rays at a higher efficiency and uses a thinner collector lens component, whereby the second embodiment provides a merit that it enables to configure the light source device compacter. The collector lens component used in the second embodiment can easily be manufactured by pressing or precisely polishing a glass material.

The third embodiment selects, for the collector lens component, a material having a higher refractive index $n_d$ of 2.2 for enhancing the utilization efficiency of rays and permitting configuring the light source device much compacter.

The fourth embodiment selects, for the collector lens component, a material having a much higher refractive index ($n_d=2.4$) so as to permit utilizing rays at a much higher efficiency and configuring the collector lens component very thin, thereby providing an additional merit that it enables to configure the light source device so as to be light in weight thereof. Selectable as a material for the collector lens component is diamond, an industrial crystalline material or the like. The utilization efficiency of rays can be remarkably enhanced by selecting a material having a refractive index $n_d$ larger than 1.6.

The fifth embodiment selects a material which has a further higher refractive index $n_d=2.6$ for the collector lens component. Though the collector lens component used in the fifth embodiment has a principal plane which is close to that of the f·tanθ type optical system, this principal plane of the collector lens component is preferable since a collector lens component having a principal plane of the f·tanθ type collector optical system may produce outer coma and lower the utilization efficiency of rays. For selecting a principal plane having an optimum shape, it is desirable to satisfy the following condition (8) as in the case of the collector lens component illustrated in FIG. 5 or FIG. 6:

$$1.03 \sin\theta_M \leq G(\theta_M) < 0.97 \tan\theta_M \qquad (8)$$

wherein the reference symbol $\theta_M$ represents an angle of emergence of a marginal ray.

If $G(\theta_M)$ is smaller than the lower limit of the condition (8), the utilization efficiency of rays will be lowered. If the upper limit of the condition (8) is exceeded, the utilization efficiency of rays will also be lowered undesirably.

Further, when the collector optical system of the light source device according to the present invention is to be composed of a single lens component having an aspherical surface, it is desirable that this lens component has thickness d satisfying the following condition (9):

$$0.2f < d < 1.5f \qquad (9)$$

If d exceeds the upper limit of the condition (9), the lens component will be heavy in weight thereof and has a small radius of curvature in absolute on a surface of emergence thereof, thereby increasing the total reflection of rays and lowering the utilization efficiency of rays. If d is smaller than the lower limit of the condition (9), in contrast, the collector lens component will be thin at a marginal portion thereof and can hardly be manufactured in practice. When a Fresnel lens component or a diffraction optical element is to be used as the collector lens component as described below, this lens component need not satisfy the condition (9).

Figure 7:
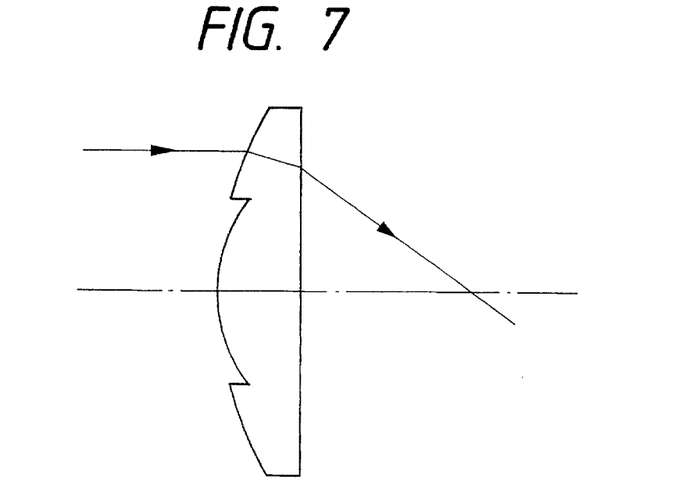
FIG. 7 through FIG. 9 show sectional views illustrating modifications of the collector optical system to be used in the light source device according to the present invention.

FIG. 7 shows a Fresnel lens component which is to be used as the collector lens component in the light source device according to the present invention. Though the function $G(\theta)$ has a discontinuous point when the Fresnel lens component is used as the collector lens component, the design concept which has been described above is applicable also to the light source device using the Fresnel lens component.

Figure 8:
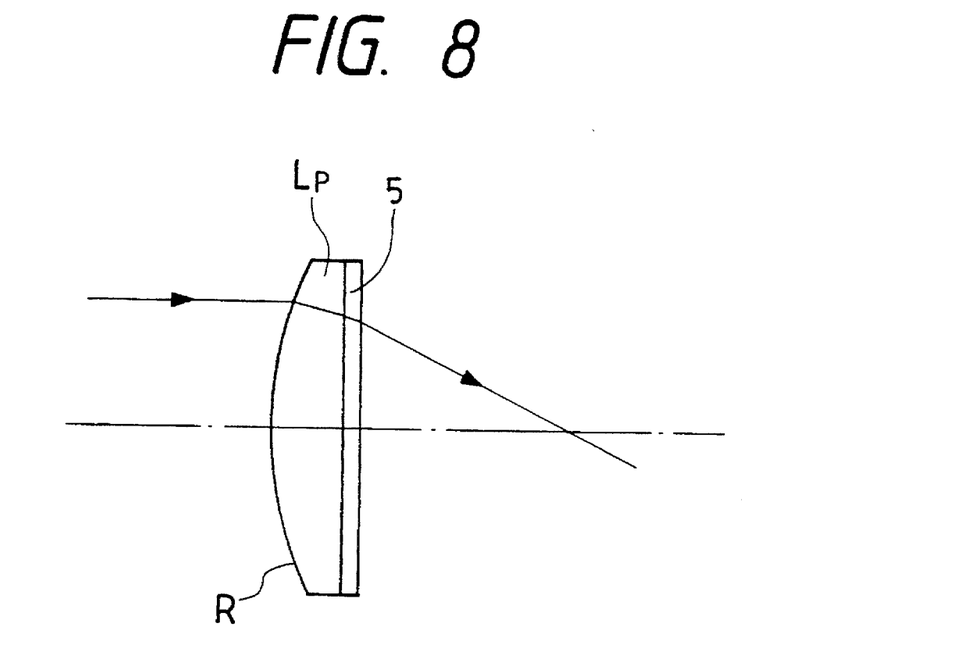

FIG. 8 shows a diffraction optical element which is to be used as the collector lens component in the light source device according to the present invention and this diffraction optical element may be, for example, a hologram lens component. This lens component is composed of a convex lens component $L_p$ having fine irregularities on the order of wavelengths of rays which are formed on a surface of emergence thereof so that it has a lens function obtained due to diffraction. This lens component is configured so as to have a principal plane having a shape within the range defined by the condition (1) by using a combination of a surface R having a positive refracting function and a diffraction optical element 5.

Figure 9:
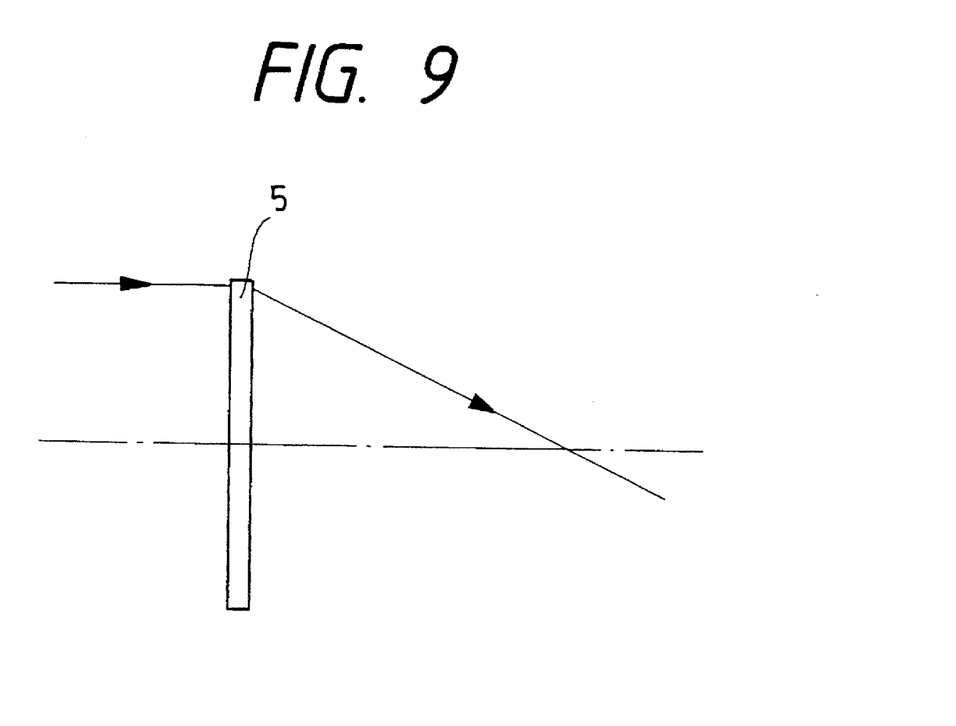

FIG. 9 shows a collector lens component which is composed only of a single planar diffraction optical element 5.

Since the example shown in FIG. 9 has a principal plane which is quite similar to that of the $f \cdot \tan\theta$ type collector optical system, the diffraction optical element 5 slightly lowers the utilization efficiency of rays, but provides a merit that it permits simplifying a composition of the collector lens component.

Now, numerical data for the collector optical systems selected for the embodiments of the light source device according to the present invention will be listed below:

Embodiment 1

$f = 1$
$d_0 = 3.3793$
$r_1 = \infty$ (aspherical surface)
  $d_1 = 0.9653$  $n_1 = 1.529$  $v_1 = 58.49$
$r_2 = -1.472$
  $d_2 = 0.5608$
$r_3 = \infty$ (end surface of incidence of light guide fiber)
  aspherical surface coefficients
  $P = 0$,  $C = 0$,  $B = 0.78322$,
  $E = -0.45883 \times 10^{-2}$,  $F = -0.1207$,
  $G = -0.26633$,  $H = 0.77378 \times 10^{-1}$,
  $I = 0.46203 \times 10^{-1}$
  $(n-1)f/r_2 = -0.359$,  $(n-1)f/r' = 0.829$,
  $Ef^3 = -0.45883 \times 10^{-2}$,  $Gf^7 = -0.26633$,
  $F < 0$,  $H > 0$,  $I > 0$,  $d_0/f = 3.3793$,  $D = 1.13$ Embodiment 2

$f = 1$
$d_0 = 1.1708$
$r_1 = \infty$ (aspherical surface)
  $d_1 = 0.6597$  $n_1 = 1.883$  $v_1 = 40.78$
$r_2 = -7.754$
  $d_2 = 0.6924$
$r_3 = \infty$ (end surface of incidence of light guide fiber)
  aspherical surface coefficients -continued $P = 0$,  $C = 0$,  $B = 0.52264$,
  $E = -0.29418 \times 10^{-2}$,  $F = 0.66303 \times 10^{-2}$,
  $G = -0.68578 \times 10^{-1}$,  $H = 0.14433 \times 10^{-1}$,
  $I = 0.59340 \times 10^{-2}$
  $(n-1)f/r_2 = -0.114$,  $(n-1)f/r' = 0.923$,
  $Ef^3 = -0.29418 \times 10^{-2}$,  $Gf^7 = -0.68578 \times 10^{-1}$,
  $F > 0$,  $H > 0$,  $I > 0$,  $d_0/f = 1.1708$,  $D = 1.74$ Embodiment 3

$f = 1$
$d_0 = 1.1792$
$r_1 = \infty$ (aspherical surface)
  $d_1 = 0.4717$  $n_1 = 2.2$
$r_2 = -12.4802$
  $d_2 = 0.7193$
$r_3 = \infty$ (end surface of incidence of light guide fiber)
  aspherical surface coefficients
  $P = 0$,  $C = 0$,  $B = 0.38453$,
  $E = -0.24392 \times 10^{-2}$,  $F = 0.48520 \times 10^{-2}$,
  $G = -0.44290 \times 10^{-1}$,  $H = 0.82269 \times 10^{-2}$,
  $I = 0.29853 \times 10^{-2}$
  $(n-1)f/r_2 = -0.096$,  $(n-1)f/r' = 0.923$,
  $Ef^3 = -0.24392 \times 10^{-2}$,  $Gf^7 = -0.44290 \times 10^{-1}$,
  $F > 0$,  $H > 0$,  $I > 0$,  $d_0/f = 1.1792$,  $D = 1.66$ Embodiment 4

$f = 1$
$d_0 = 1.1765$
$r_1 = \infty$ (aspherical surface)
  $d_1 = 0.4706$  $n_1 = 2.4$
$r_2 = -16.9394$
  $d_2 = 0.7941$
$r_3 = \infty$ (end surface of incidence of light guide fiber)
  aspherical surface coefficients
  $P = 0$,  $C = 0$,  $B = 0.33302$,
  $E = -0.61828 \times 10^{-1}$,  $F = 0.54370 \times 10^{-1}$,
  $G = -0.37657 \times 10^{-1}$,  $H = 0.84032 \times 10^{-2}$,
  $I = 0.30637 \times 10^{-2}$
  $(n-1)f/r_2 = -0.083$,  $(n-1)f/r' = 0.932$,
  $Ef^3 = -0.61828 \times 10^{-1}$,  $Gf^7 = -0.37657$,
  $F > 0$,  $H > 0$,  $I > 0$,  $d_0/f = 1.1765$,  $D = 1.72$ Embodiment 5

$f = 1$
$d_0 = 1.2121$
$r_1 = \infty$ (aspherical surface)
  $d_1 = 0.4848$  $n_1 = 2.6$
$r_2 = -22.1377$
  $d_2 = 0.797$
$r_3 = \infty$ (end surface of incidence of light guide fiber)
  aspherical surface coefficients
  $P = 0$,  $C = 0$,  $B = 0.29388$,
  $E = -0.56533 \times 10^{-1}$,  $F = 0.46830 \times 10^{-1}$,
  $G = -0.30555 \times 10^{-1}$,  $H = 0.64233 \times 10^{-2}$,
  $I = 0.22061 \times 10^{-2}$
  $(n-1)f/r_2 = -0.072$,  $(n-1)f/r' = 0.940$,
  $Ef^3 = -0.56533 \times 10^{-1}$,  $Gf^7 = -0.30555 \times 10^{-1}$,
  $F > 0$,  $H > 0$,  $I > 0$,  $d_0/f = 1.2121$,  $D = 1.74$ wherein the reference symbols $r_1$ and $r_2$ represent radii of curvature on surfaces of the collector optical system (on a reference sphere in a case where a surface is aspherical), the reference symbol $d_1$ designates thickness of the collector optical system, the reference symbol $n_1$ denotes a refractive index of the collector optical system, the reference symbol $v_1$ represents an Abbe's number of the collector optical system, the reference symbol f designates a focal length of the collector optical system as a whole, the reference symbol $d_0$ denotes a distance as measured from a light source to a first surface of the collector optical system the reference symbol $d_2$ represents a distance as measured from a final surface of the collector optical system to an end surface of incidence of a light guide fiber bundle and the reference symbol D denotes an effective diameter of the light source lamp.

Values of G(θ) selected for the embodiments of the present invention described above are listed in Table 1, whereas utilization ratios of rays obtained with the embodiments are summarized in Table 3. Further, values of f·sinθ and f·tanθ selected for the embodiments are listed in Table 2.

TABLE 1

| Embodiment | 1 | 2 | 3 | 4 | 5 |
|---|---|---|---|---|---|
| 0° | 0.00 | 0.00 | 0.00 | 0.00 | 0.00 |
| 15° | 0.25 | 0.25 | 0.25 | 0.26 | 0.26 |
| 30° | 0.5 | 0.53 | 0.52 | 0.55 | 0.55 |
| 45° | — | 0.86 | 0.81 | 0.84 | 0.85 |

TABLE 2

| | sin θ | tan θ |
|---|---|---|
| 0° | 0.00 | 0.00 |
| 15° | 0.25 | 0.27 |
| 30° | 0.5 | 0.58 |
| 45° | 0.71 | ρ |

TABLE 3

| Embodiment | 1 | 2 | 3 | 4 | 5 |
|---|---|---|---|---|---|
| Utilization ratio of ray (%) | 47.7 | 52.1 | 54.2 | 61.7 | 53.3 |

Each embodiment according to the present invention satisfies the condition (1) as clear from table 1 and satisfies the other conditions as apparent from each data stated in the above. Further, as shown in table 3, the light source device of each embodiment, has a high utilization efficiency of rays.

The values of G(θ) and the values of $(n-1)f/r_1'$, which are correspond to the condition (1) and the condition (3) of the present application, respectively, of the embodiments 1 to 3 of said Japanese Patent Kokai Publication No. Hei 1-144009 are shown in the following Tables A and B, respectively.

TABLE A

| Embodiment | 1 | 2 | 3 |
|---|---|---|---|
| 0° | 0.00 | 0.00 | 0.00 |
| 15° | 0.25 | 0.26 | 0.25 |
| 30° | 0.49 | 0.59 | 0.53 |

TABLE B

| Embodiment | 1 | 2 | 3 |
|---|---|---|---|
| | 0.650 | 0.673 | 0.585 |

In order that the lens system of each embodiment of this publication satisfies the condition (1) of the present application, it is necessary that the values of G(θ) of the lens system of the embodiments, which are shown in Table A, satisfy the condition (1), when the values of sinθ and tanθ shown in Table 2 are defined as upper and lower limits of the condition (1), respectively.

As apparent from the Tables A and B, the lens systems according to the Embodiments 1 and 2 of the above-mentioned publication are out of the condition (1). That is to say, the lens system of the embodiment 1 of the Japanese Patent Kokai Publication No. Hei 1-144009 exceeds over the lower limit of the condition (1) of the present applicatin. Accordingly, the lens system of the embodiment 1 has a longer focal length f and higher magnification than those of the collecting optical system, which satisfies tha condition (1), used in the present application. Therefore, if the offaxial coma is not correct sufficiently, the light emitted from the light source lamp cannot be sufficiently collected on a predetermined imaging point, thereby lowering the amount of light being made incident onto the light guide fiber bundle or allowing loss of the amount of light. In order to correct the aberrations well, the number of lens components, as a matter of course, will becomes larger.

Further, the value of G(θ) of the lens system according to the embodiment 2 of the Japanese Patent Kokai Publication No. Hei 1-144009 exceeds over the upper limit of said condition (1) of the present application. Therefore, a coma of offaxial ray is largely generated in the lens system of the embodiment 2, so that a light emitted from the light source lamp cannot be collected at a predetermined imaging point. As a result, the amount of light being made incident onto the light guide fiber bundle is decreased and it causes a loss of the amount of light. In order to correct the coma sufficiently, the number of lens components, as a matter of course, will becomes larger.

Furthermore, the lens system according to the embodiment 3 of Japanese Patent Kokai Publication No. Hei 1-144009 does not satisfy the condition (3) of the present application, as shown in Table B. Accordingly, a spherical aberration is generated in the lens system of the embodiment 3, so that the light cannot be collected at a predetermined imaging point. It allows to decrease the amount of light being made incident onto the light guide fiber bundle or to loss it. In order to correct the aberration will, the number of lenses components, as a matter of course, will becomes larger.

The present invention makes it possible to provide a light source device for endoscopes which comprises lens components in a number remarkably smaller than that of the lens components disposed in each of the conventional light source devices, allows a large amount of rays to emerge from light guide fiber bundles and can provide brighter illuminating light bundles. Further, the present invention makes it possible to provide a compact light source device which has a simple composition by reducing the number of the lens components comprised in each of the conventional light source devices.

I claim:

1. A light source device for endoscopes comprising: a light source and a collector optical system of said light source device for collecting rays emitted from said light source onto an end surface of incidence of a light guide fiber bundle: wherein said collector optical system satisfies the following condition (1) and comprises lens components which have aspherical surfaces at least on the side of said light source, and an aspherical lens component disposed on the closest to said light source satisfies the following condition (3):

$$\sinθ \leq G(θ) < \tanθ \quad (1)$$

$$0.6 < (n-1)f/r_1' < 15 \quad (3)$$

wherein the reference symbol n represents a refractive index of said aspherical lens components, the reference symbol $r_1'$ denotes a radius of curvature on a reference sphere of said aspherical surface, the reference symbol f designates a focal length of said collector optical system as a hole, the reference symbol h represents a height of incidence of a ray which is emitted from said light source in parallel with an optical axis and made incident on said collector lens system, the reference symbols θ denotes an angle of emergence, from said collector optical system, of said ray which has the height of incidence h, the reference symbol G(θ) represents a quotient of h/f, and wherein said aspherical surface has a shape which is expressed by the formula shown below:

$$X=CY^2/(1+(1-PC^2Y^2)^{1/2})+ BY^2+EY^4+FY^6+ GY^8+HY^{10}+IY^{12}$$

wherein the X axis is taken as the optical axis, the Y axis is taken on a plane parpendicular to the optical axis, the origin is taken as an intersection between the optical axis and the aspherical surface, the reference symbol C represents a curvature of a reference sphere of said aspherical surface, and the reference symbols P, B, E, F, G and H designate coefficients for expressing said aspherical surface, whereas $r_1'$ is expressed as ½B when both C and P are zero.

2. A light source device for endoscopes according to claim 1 wherein satisfies the following condition (2):

$$-0.6<(n-1)f/r_2<0 \tag{2}$$

wherein the reference symbol $r_2$ represents a radius of curvarure on a spherical surface of said collector lens component.

3. A light source device for endoscopes according to claim 1 wherein said collector optical system comprises a collector lens component which has an aspherical surface at least on the side of said light source and satisfies the following conditions (4), (5) and (6):

$$-0.3<Ef^3<0 \tag{4}$$

$$-1.0<Gf^7<0 \tag{5}$$

At least one of the aspherical coefficients F, H and I is positive. (6)

wherein the reference symbol f represents a focal length of said collector optical system as a whole, and the reference symbols E, F, G, H and I designate coefficients for expressing a shape of the aspherical surface, and wherein said aspherical surface has a shape expressed by the formula shown below:

$$X=CY^2/(1+(1-PC^2Y^2)^{1/2})+ BY^2+EY^4+FY^6+GY^8 +HY^{10}+IY^{12}$$

wherein the X axis is taken as the optical axis, the Y axis is taken on a plane perpendicular to the optical axis, the origin is taken as an intersection between the optical axis and said aspherical surface, the reference symbol C represents a curvature of a reference sphere of said aspherical surface, and the reference symbols P, B, E, F, G and H designate coefficients for expressing a shape of said aspherical surface.

4. A light source device for endoscopes according to claim 1 wherein said collector optical system comprises a collector lens component which has an aspherical surface at least on the side of said light source and satisfies the following condition (7):

$$0.3<d_0/f<10 \tag{7}$$

wherein the reference symbol f represents a focal length of said collector optical system as a whole and the reference symbol $d_0$ designates a distance as measured from said light source to a first lens surface of said collector optical system.

5. A light source device for endoscopes according to claim 1 wherein said collector optical system comprises a collector lens component which has an aspherical surface at least on the side of said light source and satisfies the following condition (8):

$$1.03\sin\theta_M \leq G(\theta_M)<0.97 \tan\theta_M \tag{8}$$

wherein the reference symbol $\theta_M$ represents an angle of emergence of a marginal ray from said collector optical system.

6. A light source device for endoscopes according to claim 1 wherein said collector optical system comprises a collector lens component which has an aspherical surface at least on the side of said light source and satisfies the following condition (9):

$$0.2f<d<1.5f \tag{9}$$

wherein the reference symbol f represents a focal length of said collector optical system as a whole and the reference symbol d designate thickness of said collector lens component.

* * * * *